(12) United States Patent
Dodson, III

(10) Patent No.: US 6,661,118 B2
(45) Date of Patent: Dec. 9, 2003

(54) DIFFERENTIAL VOLTAGE LIMITER

(75) Inventor: George Bertram Dodson, III, Glendale, CA (US)

(73) Assignee: ADC DSL Systems, Inc., Eden Prairie, MN (US)

(*) Notice: Subject to any disclaimer, the term of this patent is extended or adjusted under 35 U.S.C. 154(b) by 159 days.

(21) Appl. No.: 10/036,686

(22) Filed: Dec. 21, 2001

(65) Prior Publication Data

US 2003/0117020 A1 Jun. 26, 2003

(51) Int. Cl.[7] .................................................. H02J 1/10
(52) U.S. Cl. .......................................... 307/18; 307/87
(58) Field of Search ........................ 307/18, 35, 42–44, 307/87, 139, 140; 327/50, 52, 54, 63

(56) References Cited

U.S. PATENT DOCUMENTS

| | | | | |
|---|---|---|---|---|
| 3,701,014 A | * | 10/1972 | Wang | ........................... 324/98 |
| 4,206,418 A | * | 6/1980 | Dingwall | ..................... 330/253 |
| 5,731,695 A | * | 3/1998 | Shioda et al. | ................ 323/299 |
| 5,736,869 A | * | 4/1998 | Wei | .............................. 326/81 |
| 5,781,391 A | * | 7/1998 | Ide et al. | .................... 361/91.5 |

* cited by examiner

Primary Examiner—Gregory J. Toatley, Jr.
Assistant Examiner—Sharon A. Polk
(74) Attorney, Agent, or Firm—Fogg & Associates, LLC; Laura A. Ryan

(57) ABSTRACT

A low cost differential voltage limiter circuit provides a feedback to regulate a voltage output of a voltage source. In one embodiment, the limiter circuit includes a transistor coupled to outputs of first and second voltage sources. If a differential voltage between the two sources exceeds a predetermined threshold, the output voltage of the higher source is reduced. In one embodiment, a PNP transistor is used to regulate the high voltage source.

17 Claims, 1 Drawing Sheet

DIFFERENTIAL VOLTAGE LIMITER

FIELD OF THE INVENTION

The present invention relates generally to power supplies and in particular the present invention relates to circuitry to limit a differential voltage between power supplies.

BACKGROUND OF THE INVENTION

In digital systems it is common for many integrated circuits to require two or more supply voltages, such as separate "core" and "I/O" power inputs on digital microcontrollers. In many cases, the maximum differential voltage allowed between supply voltage input ports is less than one or both of the supply voltages. For example, an integrated circuit may require a first power supply of 3.3 volts and a second power supply of 2.5 volts. A maximum differential between the two supplies cannot exceed 2 volts. This requirement, does not allow for the 3.3V or 2.5V supply to be fully powered when the second supply is at 0 v without risking catastrophic damage.

As it is highly desirable for digital integrated circuits to not be damaged in the event of a short circuit or absence of supply voltage on one input port, a circuit which can automatically limit applied voltages to less than maximum ratings is needed. For the reasons stated above, and for other reasons stated below which will become apparent to those skilled in the art upon reading and understanding the present specification, there is a need in the art for a differential voltage limiter circuit.

SUMMARY OF THE INVENTION

The above-mentioned problems with integrated circuits and other problems are addressed by the present invention and will be understood by reading and studying the following specification.

In one embodiment, a voltage source circuit comprises a first voltage source having an output to provide a first output voltage, and a second voltage source having an output to provide a second output voltage. The second output voltage is less than the first output voltage. A differential limiter circuit is coupled to the first and second voltage sources. The differential limiter circuit comprises a feedback transistor coupled to a control input of the first voltage source.

In another embodiment, a voltage source circuit comprises a first voltage source having an output to provide a first output voltage, and a second voltage source having an output to provide a second output voltage. The second output voltage is less than the first output voltage. A PNP feedback transistor has base, emitter and collector nodes. The collector node is coupled to a control input of the first voltage source. A resistor divider circuit is coupled between the outputs of the first and second voltage sources, where a center node of the resistor divider is coupled to the base node of the PNP transistor. A degeneration resistor is coupled between the first voltage source and the emitter.

In yet another embodiment, a voltage source circuit comprises a first voltage source having an output to provide a first output voltage of about 3.3 volts, and a second voltage source having an output to provide a second output voltage of about 2.5 volts. A first resistor divider includes a first resistor coupled between the output of the first voltage source and the control node, and a second resistor coupled between the control node and ground. A voltage on the control node controls the first output voltage. A PNP feedback transistor includes base, emitter and collector nodes. The collector node is coupled to a control input of the first voltage source. A second resistor divider circuit is coupled between the outputs of the first and second voltage sources. A center node of the resistor divider is coupled to the base node of the PNP transistor. A degeneration resistor is coupled between the first voltage source and the emitter.

A method of controlling power supplies for an integrated circuit comprises monitoring first and second power supply levels provided by first and second sources, and reducing the first power supply level if the first power supply level exceeds the second power supply level by a predetermined voltage. The first power supply level is reduced by activating a feedback transistor coupled to a control node of a first power supply.

DETAILED DESCRIPTION OF THE DRAWINGS

Figure 1:
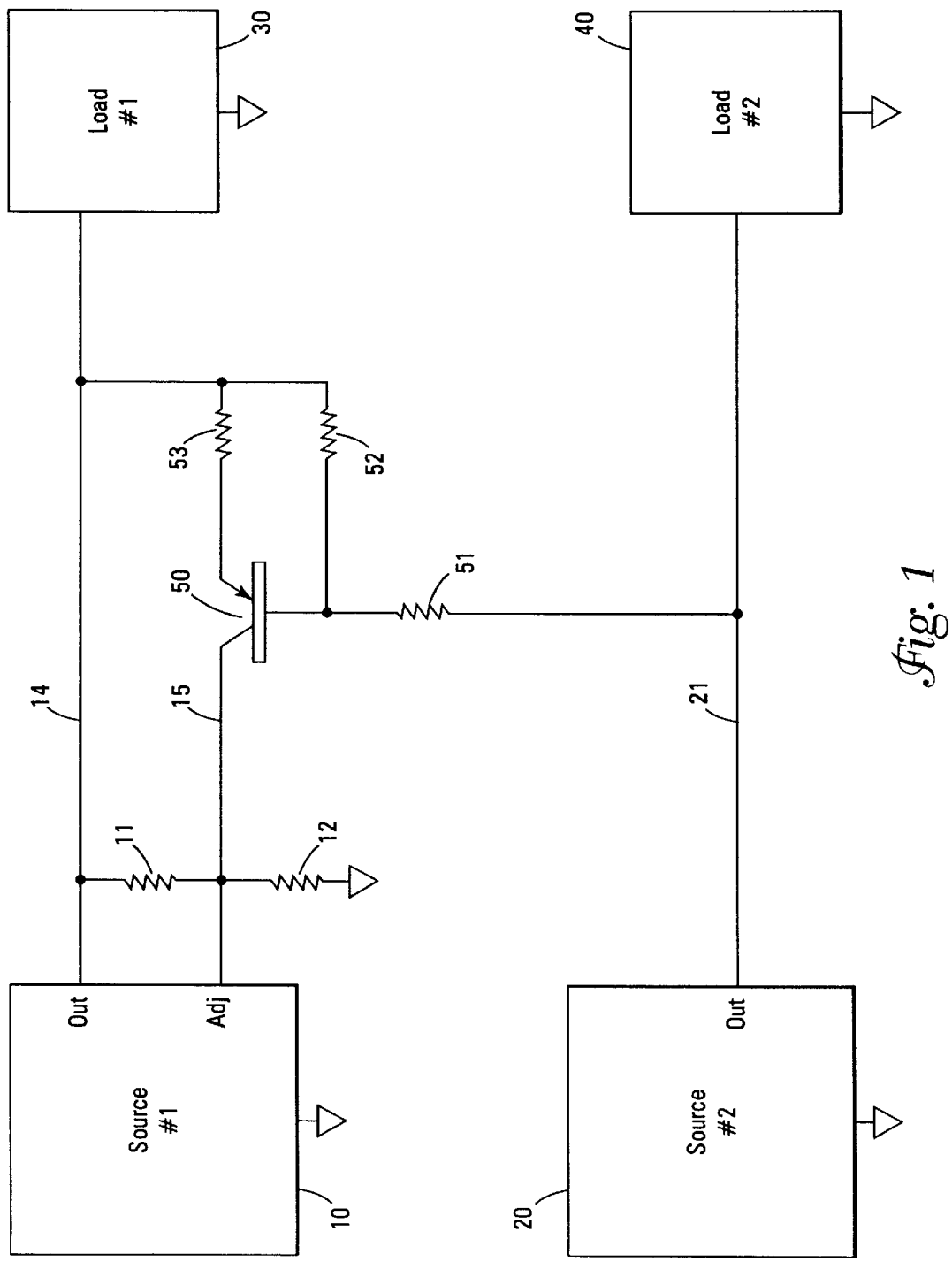
FIG. 1 is a schematic diagram of a voltage differential limiter circuit of an embodiment of the present invention.

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

An embodiment of the present invention provides an inexpensive circuit to limit differential supply voltages on common types of switching power supply controllers and linear regulators. As explained above, an integrated circuit may require a first power supply of 3.3 volts and a second power supply of 2.5 volts. A maximum differential between the two supplies cannot exceed 2 volts. This requirement, does not allow for the 3.3V or 2.5V supply to be fully powered when the second supply is at 0 v without risking catastrophic damage. In one embodiment, the second power supply voltage of 2.5V is derived from the first power supply voltage of 3.3V. As such, a condition where the second power supply voltage of 2.5V is fully powered in the absence of the first power supply voltage of 3.3V is not possible. In cases where a second power supply voltage is not derived from the first power supply voltage, it is recognized that a second differential limiter circuit may be required in conjunction with a second power supply source controllable by means of a control input port. For the sake of clarity, the following discussion is restricted to the operation of one differential limiter.

Referring to FIG. 1, an integrated circuit has two power supply input connections. The integrated circuit can be any type of commercially available or application specific integrated circuit (ASIC). Internal circuits, illustrated as load blocks, are provided in the integrated circuit. The integrated circuit manufacturer typically specifies a maximum differential allowable voltage between the two power supply inputs. Difficulties arise if one voltage source fails to power-up or is slow to reach its output level in comparison to a second voltage source. In particular, a higher voltage source may reach its voltage prior to a lower source reaching its output level. The resultant differential voltage may exceed a specified level.

A first voltage source 10 provides power to load 30 over power bus 14. A second voltage source 20 provides power to load 40 over power bus 21. Voltage source 10 includes a control port 15 that adjusts the output voltage on power bus 14. The output voltage is controlled by resistors 11 and 12 that form a feedback resistor divider.

A PNP transistor 50 is used to control the output voltage of source 10. In one embodiment, transistor 50 has a threshold voltage of approximately 0.6V. Resistors 51 and 52 form a voltage divider that multiplies the effective turn on point of transistor 50 to a desired value. Resistor 53 is a degeneration resistor that softens the abrupt turn on of transistor 50. This reduces the effective loop gain added by the differential limiter circuit so as to prevent oscillation problems under limiting conditions. The values of the resistor are selected based upon a particular circuit. In one embodiment supply 10 provided a 3.3 v output and supply 20 provides an output of 2.5 v. A maximum specified differential is 2 v, with a desired maximum differential limited to 1.8 v. First voltage source 10 operates with a control voltage of 0.8V at port 15. In this embodiment, resistor 11 is 6.34K, resistor 12 is 2K, resistor 51 is 20k, resistor 52 is 20k and resistor 53 is 1k.

In operation, resistors 11 and 12 provide a steady state voltage on port 15 of about 0.8V. Resistors 51 and 52 provide a steady state voltage of about 2.9 v. As such, the transistor base voltage (Vb) is 2.9 v, collector voltage (Vc) is 2 v and the emitter voltage (Ve) is about 3.3 v. The transistor, therefore, has a Veb of 0.4 v and is normally turned off. When the transistor is off, it does not supply current to node 15. The transistor remains turned off until the base voltage drops to provide a Veb of 0.6, or the threshold of the transistor.

For example, if source 20 is at 1.3 v, the base voltage of transistor 50 is 2.3 v. The transistor is turned on to provide a collector current to node 15. As such, voltage on the output of source 10 is decreased until the Veb of transistor 50 drops to the threshold value. The differential limiter circuit, therefore, prohibits the first voltage source output from exceeding the second voltage source output by a predetermined voltage differential.

The above described resistor and voltage values are for illustration only, and the present invention is not limited to the specific values. In addition, the first and second voltage sources can be two discrete sources, or second source can be derived from the first source.

Conclusion

A low cost differential voltage limiter circuit has been described that provides a feedback to regulate a voltage output of a voltage source. The limiter circuit includes a transistor coupled to outputs of first and second voltage sources. If a differential voltage between the two sources exceeds a predetermined threshold, the output voltage of the higher source is reduced. In one embodiment, a PNP transistor has a base coupled to a resistor divider between outputs of low and high voltage sources. A collector of the transistor is coupled to a control port of a higher voltage source. The emitter is coupled resistively to the output of the high voltage source.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A voltage source circuit comprising:
    a first voltage source having an output to provide a first output voltage;
    a second voltage source having an output to provide a second output voltage, wherein the second output voltage is less than the first output voltage; and
    a differential limiter circuit coupled to the first and second voltage sources, the differential limiter circuit comprises a feedback transistor coupled to a control input of the first voltage source.

2. The voltage source circuit of claim 1 wherein the differential limiter circuit comprises:
    a PNP feedback transistor having base, emitter and collector nodes, the collector node is coupled to the control input;
    a resistor divider circuit coupled between the outputs of the first and second voltage sources, a center node of the resistor divider is coupled to the base node of the PNP transistor; and
    a degeneration resistor coupled between the first voltage source and the emitter.

3. The voltage source circuit of claim 1 wherein the first output voltage is less than 1 volt greater than the second output voltage.

4. The voltage source circuit of claim 3 wherein the first output voltage is about 3.3 volts and the second output voltage is about 2.5 volts.

5. The voltage source circuit of claim 1 further comprising a resistor divider having a first resistor coupled between the output of the first voltage source and the control node, and a second resistor coupled between the control node and ground.

6. A voltage source circuit comprising:
    a first voltage source having an output to provide a first output voltage;
    a second voltage source having an output to provide a second output voltage, wherein the second output voltage is less than the first output voltage;
    a PNP feedback transistor having base, emitter and collector nodes, the collector node is coupled to a control input of the first voltage source;
    a resistor divider circuit coupled between the outputs of the first and second voltage sources, a center node of the resistor divider is coupled to the base node of the PNP transistor; and
    a degeneration resistor coupled between the first voltage source and the emitter.

7. The voltage source circuit of claim 6 wherein the first output voltage is less than 1 volt greater than the second output voltage.

8. The voltage source circuit of claim 7 wherein the first output voltage is about 3.3 volts and the second output voltage is about 2.5 volts.

9. The voltage source circuit of claim 6 further comprising a second resistor divider having a first resistor coupled between the output of the first voltage source and the control node, and a second resistor coupled between the control node and ground.

10. A voltage source circuit comprising:
    a first voltage source having an output to provide a first output voltage of about 3.3 volts;

a second voltage source having an output to provide a second output voltage of about 2.5 volts;

a first resistor divider having a first resistor coupled between the output of the first voltage source and the control node, and a second resistor coupled between the control node and ground, wherein a voltage on the control node controls the first output voltage;

a PNP feedback transistor having base, emitter and collector nodes, the collector node is coupled to a control input of the first voltage source;

a second resistor divider circuit coupled between the outputs of the first and second voltage sources, a center node of the resistor divider is coupled to the base node of the PNP transistor; and a degeneration resistor coupled between the first voltage source and the emitter.

11. The voltage source circuit of claim 10 wherein the first resistor is about 6340 ohms and the second resistor is about 2000 ohms.

12. The voltage source circuit of claim 10 wherein the second resistor divider circuit comprises third and fourth resistors each having a resistance X.

13. The voltage source circuit of claim 12 wherein X is about 20000 ohms.

14. The voltage source circuit of claim 10 wherein the degeneration resistor is about 1000 ohms.

15. A method of controlling power supplies for an integrated circuit comprising:

monitoring first and second power supply levels provided by first and second sources; and reducing the first power supply level if the first power supply level exceeds the second power supply level by a predetermined voltage, wherein the first power supply level is reduced by activating a feedback transistor coupled to a control node of a first power supply.

16. The method of claim 15 wherein the feedback transistor is a PNP transistor having a collector coupled to the control node, an emitter resistively coupled to the first power supply level, and a base coupled to receive a base voltage that is between the first and second power supply levels.

17. The method of claim 16 wherein the base voltage is determined by a resistor divider circuit coupled between the first and second sources.

* * * * *